US012209443B2

(12) United States Patent
Wise et al.

(10) Patent No.: US 12,209,443 B2
(45) Date of Patent: Jan. 28, 2025

(54) DOOR LATCH BLOCK AND ASSEMBLY

(71) Applicant: Activar Construction Products Group, Inc., Edina, MN (US)

(72) Inventors: David R. Wise, New Westminster (CA); Kim Thomas Sefton Band, Surrey (CA); David John Ashcroft, Coquitlam (CA)

(73) Assignee: Activar Construction Products Group, Inc., Bloomington, MN (US)

( * ) Notice: Subject to any disclaimer, the term of this patent is extended or adjusted under 35 U.S.C. 154(b) by 399 days.

(21) Appl. No.: 17/664,266

(22) Filed: May 20, 2022

(65) Prior Publication Data

US 2022/0372788 A1 Nov. 24, 2022

Related U.S. Application Data

(60) Provisional application No. 63/201,969, filed on May 20, 2021.

(51) Int. Cl.
*E05B 9/08* (2006.01)

(52) U.S. Cl.
CPC .................................... *E05B 9/08* (2013.01)

(58) Field of Classification Search
CPC .......... E05B 9/08; E05B 9/082; Y10S 292/53; Y10S 292/54; Y10S 292/20; Y10S 292/47; Y10T 292/0894; Y10T 292/0906; Y10T 292/438
See application file for complete search history.

(56) References Cited

U.S. PATENT DOCUMENTS

| | | | | |
|---|---|---|---|---|
| 2,074,464 | A | 3/1937 | Dwyer | |
| 10,000,944 | B2 | 6/2018 | Cavallaro, Jr. | |
| 10,227,803 | B2 | 3/2019 | Gooding | |
| 2008/0203736 | A1 * | 8/2008 | Ramsauer | E05C 3/042 292/58 |
| 2011/0302847 | A1 * | 12/2011 | Johnson | E05B 63/0056 248/274.1 |
| 2022/0213719 | A1 * | 7/2022 | Bullwinkel | E05B 9/086 |

OTHER PUBLICATIONS

"Canadian Application Serial No. 3,159,939, Office Action mailed Jul. 28, 2023", 4 pgs.

* cited by examiner

*Primary Examiner* — Christine M Mills
*Assistant Examiner* — Yahya Sidky
(74) *Attorney, Agent, or Firm* — Schwegman Lundberg & Woessner, P.A.

(57) ABSTRACT

Various examples are directed to apparatus and methods for providing a door latch block assembly. An apparatus includes a first planar surface configured to mount parallel to and facing away from a first side of a door frame, and a second planar surface configured to mount flush with and facing toward the first side of the door frame. The apparatus further includes a rectangular protrusion extending from the second planar surface configured to extend through an aperture in the door frame and protrude from a second side of the door frame. The apparatus also includes cylindrical openings extending through the latch block apparatus configured to receive hardware for affixing a latching mechanism to a distal end of the protrusion. The apparatus is configured to provide precise alignment of the latching mechanism for securing the door frame to a door.

20 Claims, 13 Drawing Sheets

DOOR LATCH BLOCK AND ASSEMBLY

CLAIM OF PRIORITY AND INCORPORATION BY REFERENCE

The present application claims the benefit under 35 U.S.C. § 119(e) of U.S. Provisional Patent Application 63/201,969, filed May 20, 2021, which is hereby incorporated by reference herein in its entirety.

TECHNICAL FIELD

Embodiments described herein generally relate to securing latches to doors and, for example and without limitation, to apparatus, systems and methods for a door latch block and assembly.

BACKGROUND

Doors and access panels often include latches to provide for opening and closing. Many doors and access panels are located in visible areas so, when closed, should provide a consistent and uniform surface. There is a need for improved assemblies for providing door latch blocks for ease of mounting, opening and securing doors.

SUMMARY

Disclosed herein, among other things, are apparatus and methods for providing a door latch block and assembly. One aspect of the present subject matter includes a latch block apparatus including a first planar surface configured to mount parallel to and facing away from a first side of an door frame, and a second planar surface configured to mount flush with and facing toward the first side of the door frame. The apparatus further includes a rectangular protrusion extending from the second planar surface, the rectangular protrusion configured to extend through an aperture in the door frame and protrude from a second side of the door frame when the latch block apparatus is mounted to the door frame. The apparatus also includes two or more cylindrical openings extending through the latch block apparatus from the first planar surface through the second planar surface and the rectangular protrusion, the two or more cylindrical openings configured to receive hardware for affixing a latching mechanism to a distal end of the protrusion. The latch block apparatus is configured to provide precise alignment of the latching mechanism for securing the door frame to a door in a closed position.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

Some embodiments are illustrated by way of example, and not of limitation, in the figures of the accompanying drawings, which are not necessarily drawn to scale, in which.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter provides a door latch block for use on many different types of doors, including but not limited to access doors or panels for commercial buildings, metal cabinet doors, medicine cabinet doors, barbeque doors, fire extinguisher cabinet doors, and kitchen cabinet doors. The present door latch block can be used on other types of doors without departing from the scope of the present subject matter.

In one embodiment, the present door latch block assembly can be used on an access door. Many commercial buildings include access doors to provide for ingress or egress from the buildings and/or to provide for maintenance access to hidden fixtures and equipment. Hidden hinges or latches are desirable for access doors to provide a desirable appearance. In addition, access doors should open and close properly to provide both ease of access and a consistent and uniform surface with existing walls, floors, or ceilings.

The present subject matter provides a door latch block that secures to the frame of a door and provides for secure and precise connection to a latching mechanism. The present door latch block provides for a sealed frame assembly, excellent tolerance control of a door latch with respect to the door frame, and a clean and finished look for doors and frames. In addition, the door latch block assembly is constructed of durable material, includes a mechanism for attachment to a door frame without additional hardware, and provides for convenient and precise attachment of latch hardware.

Figure 1A:
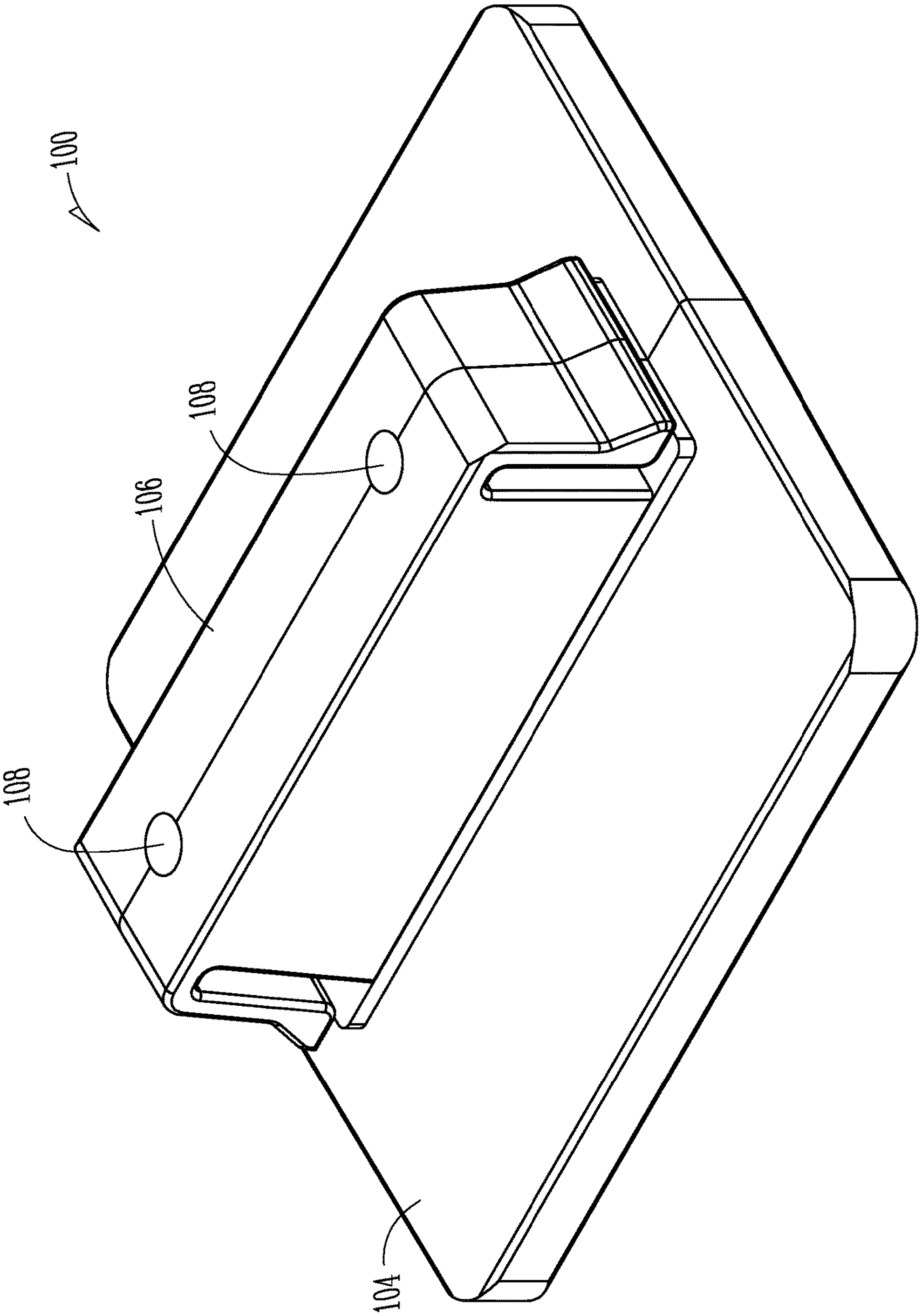
FIGS. 1A-1D illustrate various views of an example embodiment of a door latch block assembly.
Figure 1B:
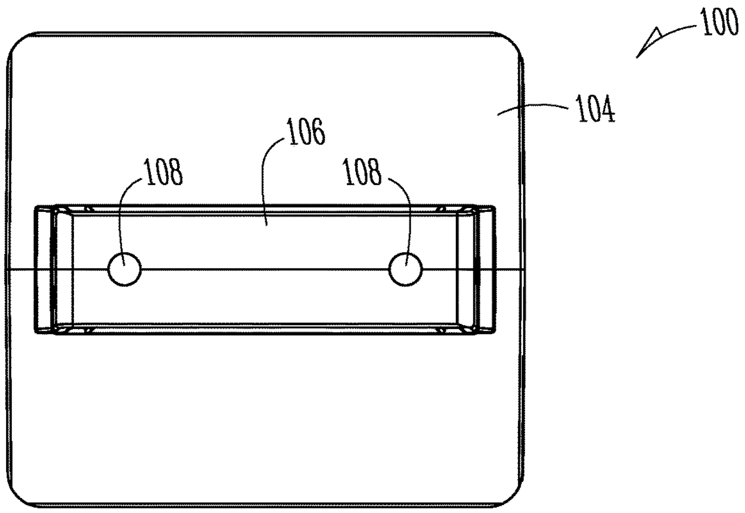
Figure 1C:
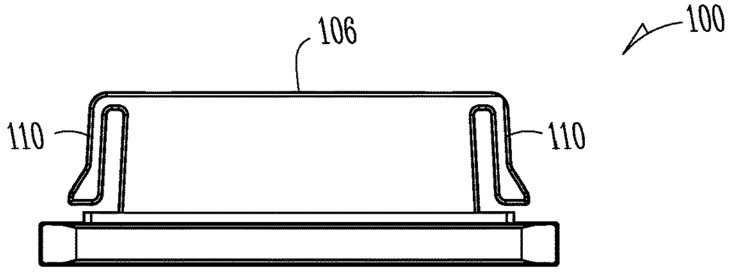
Figure 1D:
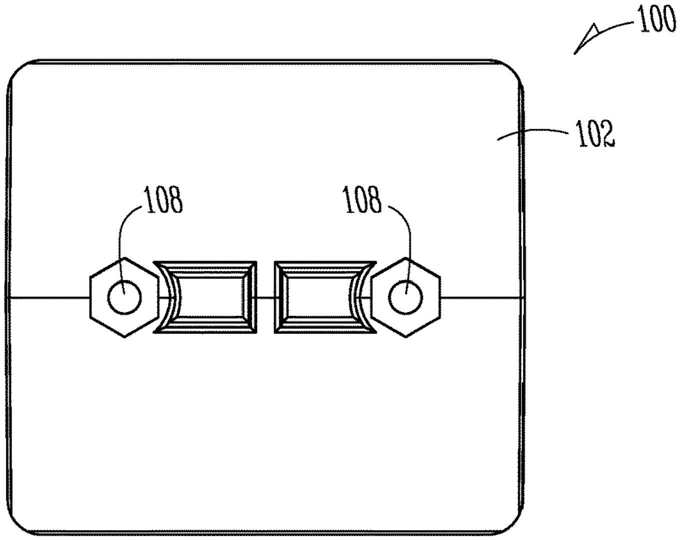

FIGS. 1A-1D illustrate various views of an example embodiment of a door latch block assembly or apparatus. FIG. 1A illustrates a perspective view of a door latch block apparatus 100 for use with doors, FIG. 1B illustrates a bottom view of the door latch block apparatus 100, FIG. 1C illustrates a side view of the door latch block apparatus 100, and FIG. 1D illustrates a top view of the door latch block assembly apparatus. The door latch block apparatus 100 includes a first planar surface 102 configured to mount parallel to and facing away from a first side of a door frame for a construction surface, and a second planar surface 104 configured to mount flush with and facing toward the first side of the door frame. The apparatus 100 also includes a rectangular protrusion 106 extending from the second planar surface 104, the rectangular protrusion 106 configured to extend through an aperture in the door frame and protrude from a second side of the door frame when the latch block apparatus 100 is mounted to the door frame.

The apparatus 100 further provides two or more cylindrical openings 108 extending through the latch block apparatus 100 from the first planar surface 102 through the second planar surface 104 and the rectangular protrusion 106, the two or more cylindrical openings 108 configured to receive hardware for affixing a latching mechanism to a distal end of the protrusion. The latch block apparatus 100 is configured to provide precise alignment of the latching mechanism for securing the door frame to a door in a closed position.

In various embodiments, the rectangular protrusion 106 includes engagement teeth 110 on opposite ends of the rectangular protrusion 106 to engage the latch block apparatus 100 to the door frame. For example, the engagement teeth can be compressed inwards when inserting the protrusion through the frame, and fingers holding the engagement teeth are sized to expand and engage the teeth against the opposite side of the frame to secure the latch block apparatus once fitted in the frame. The engagement teeth thereby function to maintain contact between the second planar surface and the surface of the frame, without requiring the use of a separate connector or hardware.

According to various embodiments, the latch block apparatus 100 may be constructed from a number of materials. In some embodiments, the latch block apparatus 100 is constructed from plastic. The latch block apparatus 100 is constructed from a cast nylon material, in some embodiments. In various embodiments, the latch block apparatus 100 is constructed from a glass-filled cast nylon material. The latch block apparatus is constructed from 30% glass-filled nylon 6, in various embodiments. In some embodiments, the latch block apparatus is constructed of fire-resistant or heat-resistant material.

Figure 2:
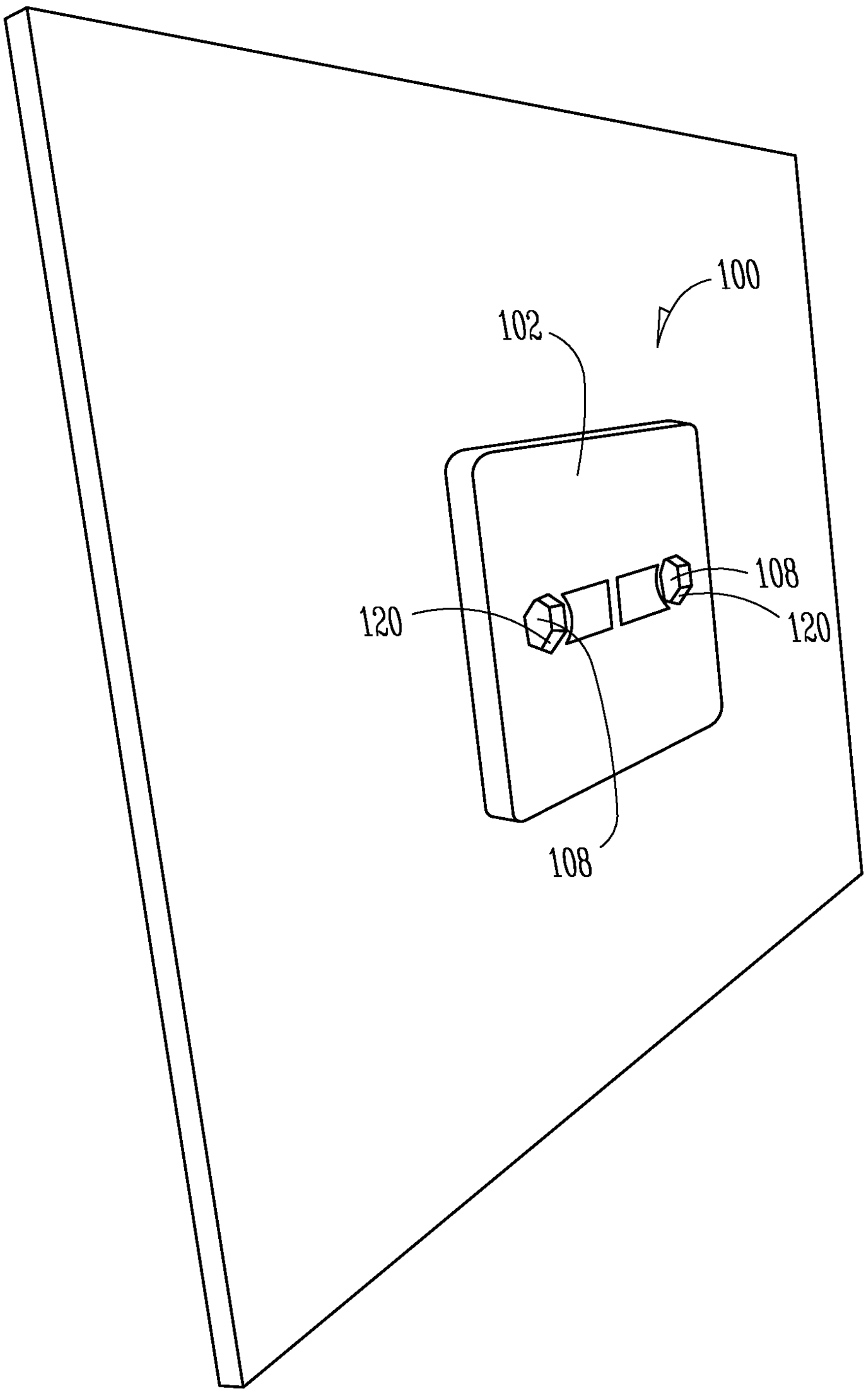
FIG. 2 illustrates a top view of an example embodiment of a door latch block assembly.

FIG. 2 illustrates a top view of an example embodiment of a door latch block assembly or apparatus 100. The latch block apparatus 100 includes a first planar surface 102 having recessed portions 120 of the two or more cylindrical openings 108 having a hexagonal shape and configured to secure a head portion of the hardware.

Figure 3:
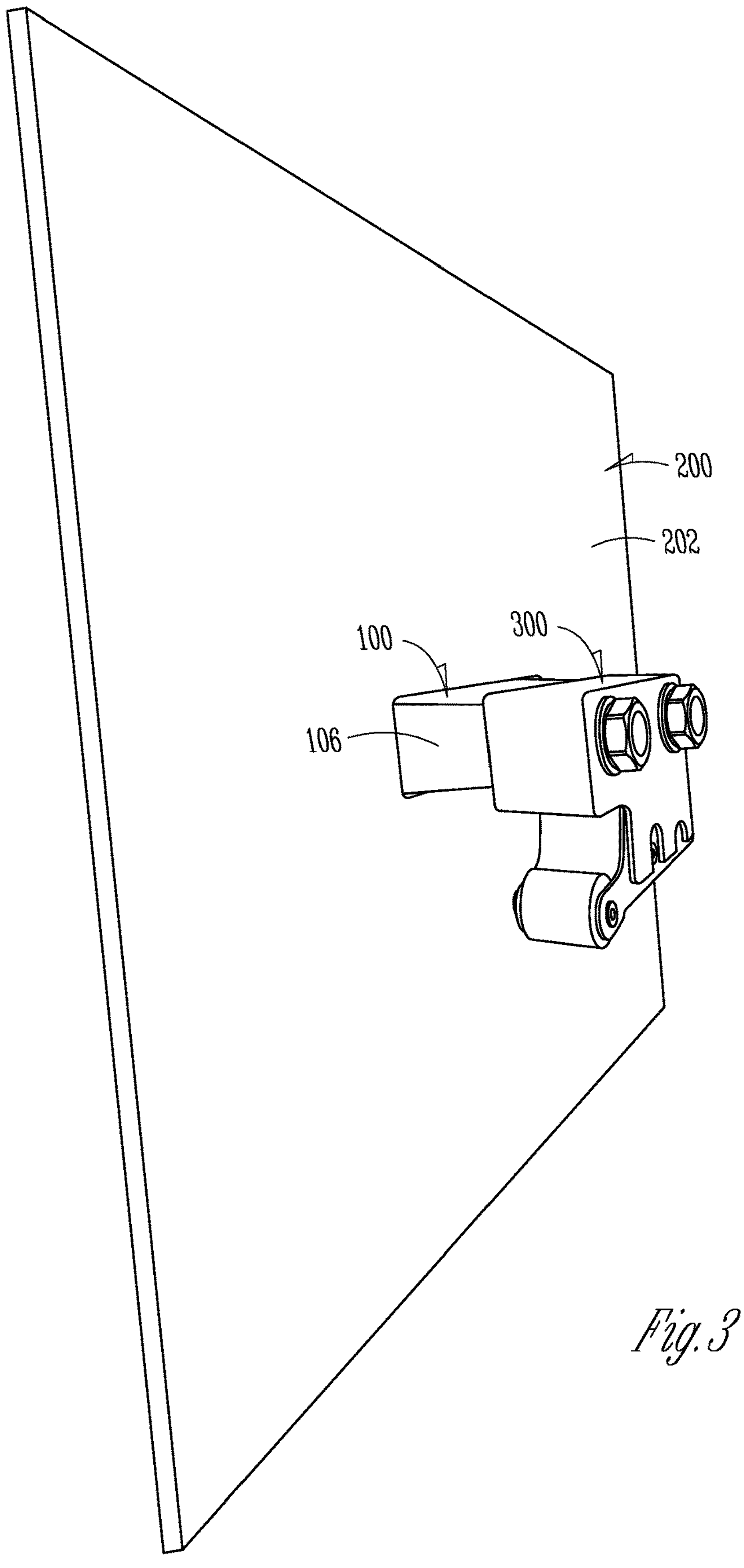
FIG. 3 illustrates a bottom view of an example embodiment of a door latch block assembly and latch.

FIG. 3 illustrates a bottom view of an example embodiment of a door latch block assembly or apparatus 100 and latch 300. The apparatus 100 includes a rectangular protrusion 106 configured to extend through an aperture in the door frame 200 and protrude from a second side 202 of the door frame 200 when the latch block apparatus 100 is mounted to the door frame 200. The latching mechanism or latch 300 is shown connected to a distal end of the protrusion 106.

Figure 4:
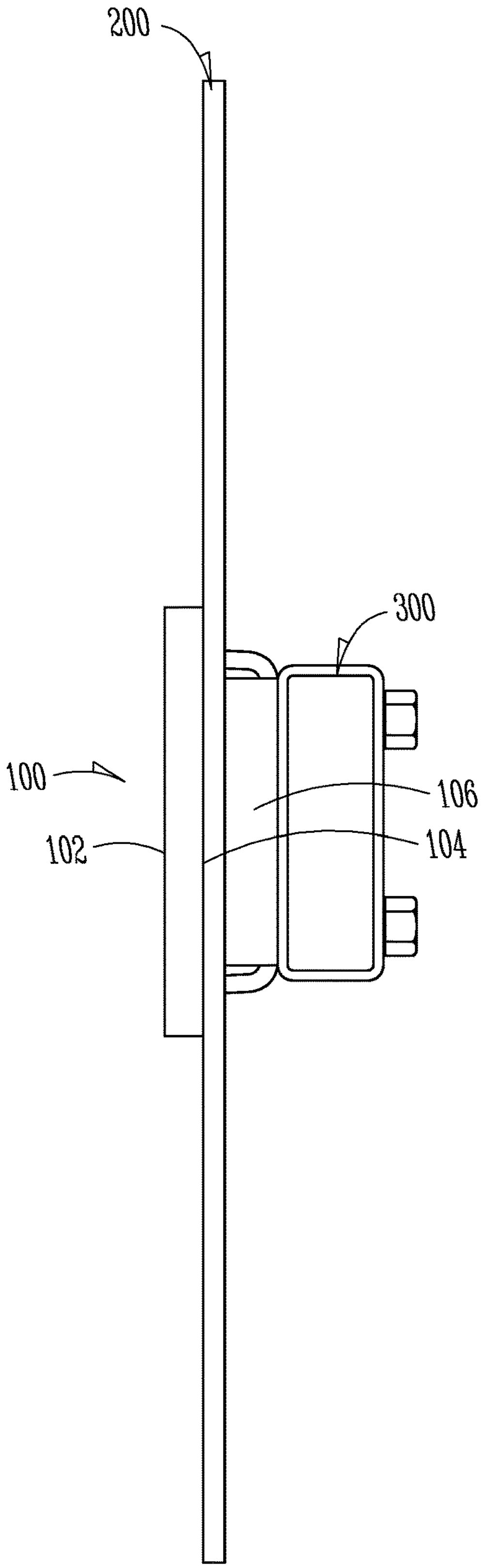
FIG. 4 illustrates a lateral view of an example embodiment of a door latch block assembly and latch.

FIG. 4 illustrates a lateral view of an example embodiment of a door latch block assembly or apparatus 100 and latch 300. The door latch block apparatus 100 includes a first planar surface 102 configured to mount parallel to and facing away from a first side of a door frame 200, and a second planar surface 104 configured to mount flush with and facing toward the first side of the door frame 200. The apparatus 100 also includes a rectangular protrusion 106 extending from the second planar surface 104, the rectangular protrusion 106 configured to extend through an aperture in the door frame 200 and protrude from a second side of the door frame 200 when the latch block apparatus 100 is mounted to the door frame 200. The latching mechanism or latch 300 is shown connected to a distal end of the protrusion 106.

Figure 5:
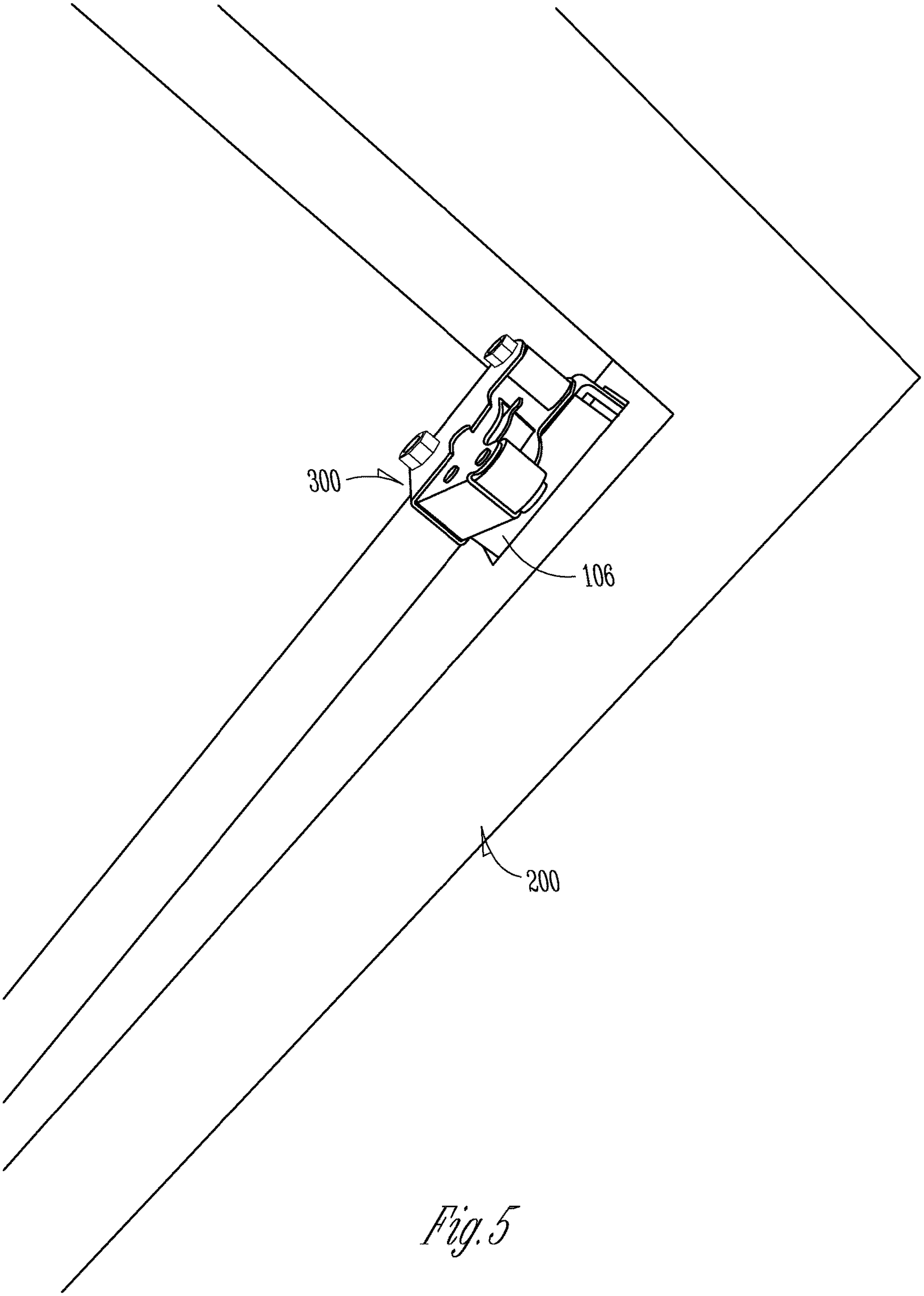
FIG. 5 illustrates a lateral view of an example embodiment of a door latch block assembly, latch, and door frame.

FIG. 5 illustrates a lateral view of an example embodiment of a door latch block assembly or apparatus 100, latch 300, and door frame 200. The rectangular protrusion 106 is configured to extend through an aperture in the door frame 200 and protrude from a second side of the door frame 200 when the latch block apparatus 100 is mounted to the door frame 200. The latching mechanism or latch 300 is shown connected to a distal end of the protrusion 106.

Figure 6:
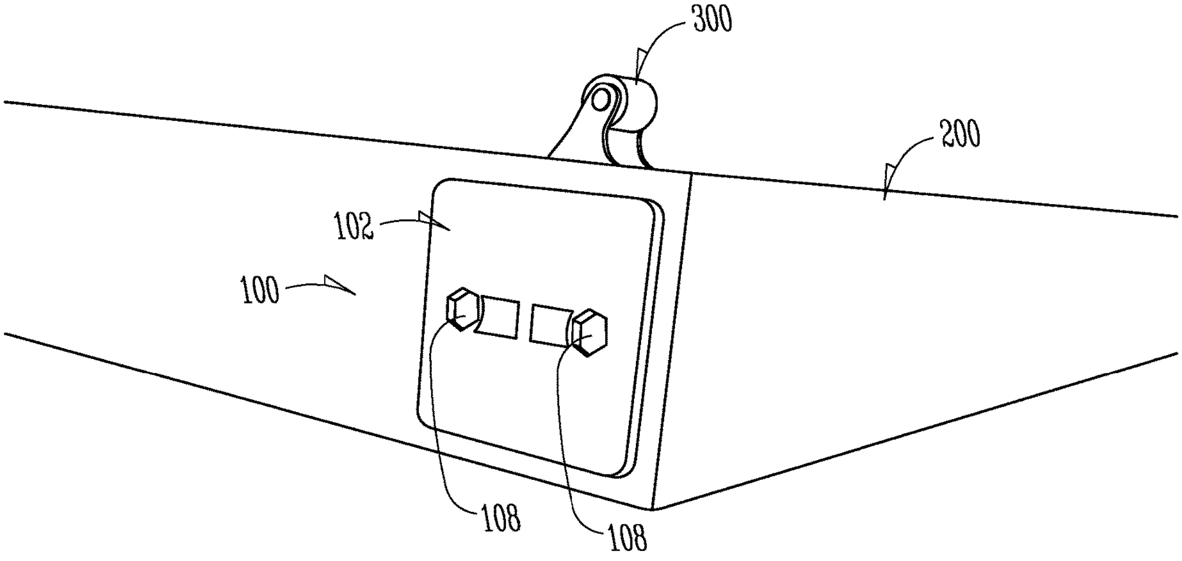
FIG. 6 illustrates a top view of an example embodiment of a door latch block assembly, latch, and door frame.

FIG. 6 illustrates a top view of an example embodiment of a door latch block assembly or apparatus 100, latch 300, and door frame 200. The door latch block apparatus 100 includes a first planar surface 102 configured to mount parallel to and facing away from a first side of a door frame for a construction surface. The apparatus 100 further provides two or more cylindrical openings 108 extending through the latch block apparatus 100 from the first planar surface 102, the two or more cylindrical openings 108 configured to receive hardware for affixing a latching mechanism or latch 300.

Figure 7:
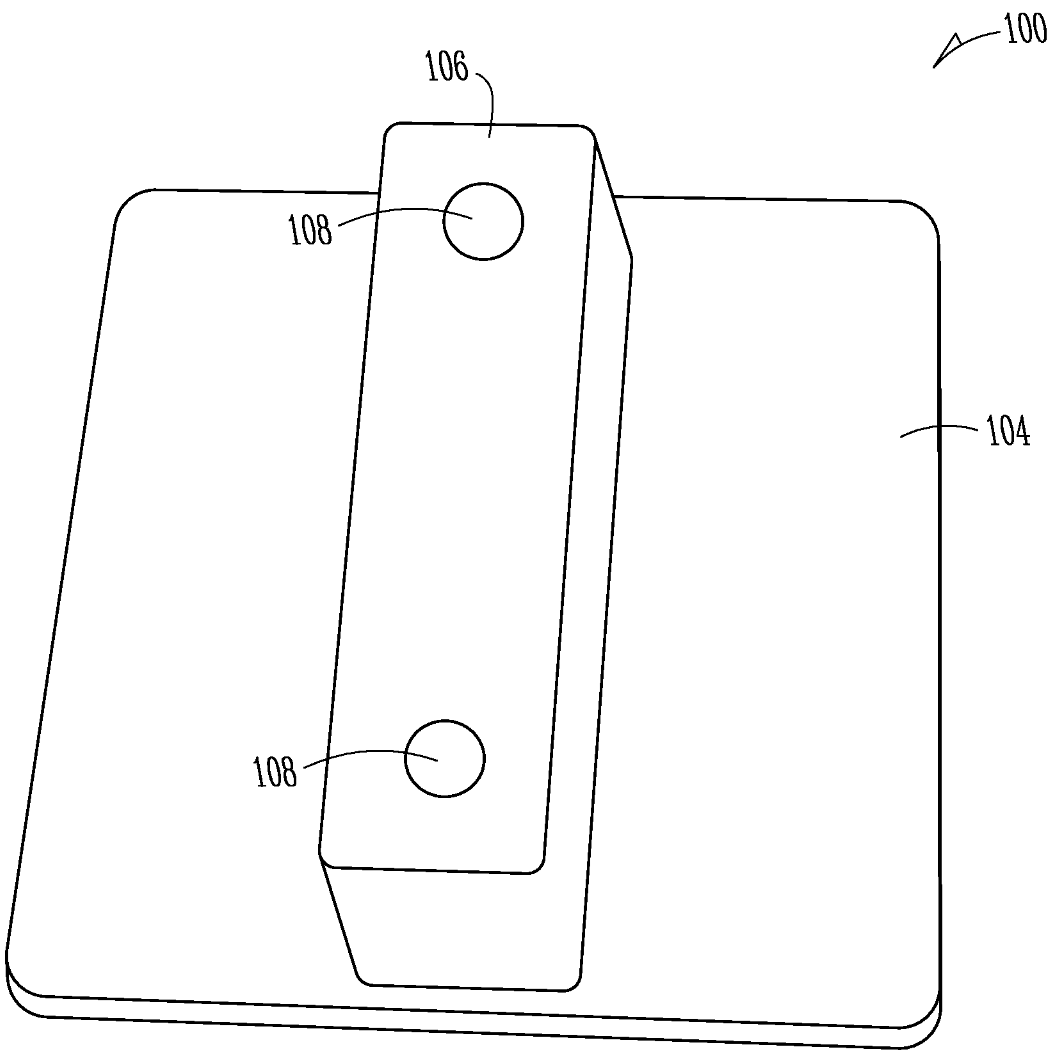
FIG. 7 illustrates a bottom view of an example embodiment of a door latch block assembly.

FIG. 7 illustrates a bottom view of an example embodiment of a door latch block assembly or apparatus 100. The door latch block apparatus 100 includes a second planar surface 104 configured to mount flush with and facing toward the first side of the door frame. The apparatus 100 also includes a rectangular protrusion 106 extending from the second planar surface 104, the rectangular protrusion 106 configured to extend through an aperture in the door frame and protrude from a second side of the door frame when the latch block apparatus 100 is mounted to the door frame. The apparatus 100 further provides two or more cylindrical openings 108 extending through the latch block apparatus 100 through the second planar surface 104 and the rectangular protrusion 106, the two or more cylindrical openings 108 configured to receive hardware for affixing a latching mechanism to a distal end of the protrusion 106.

Figure 8:
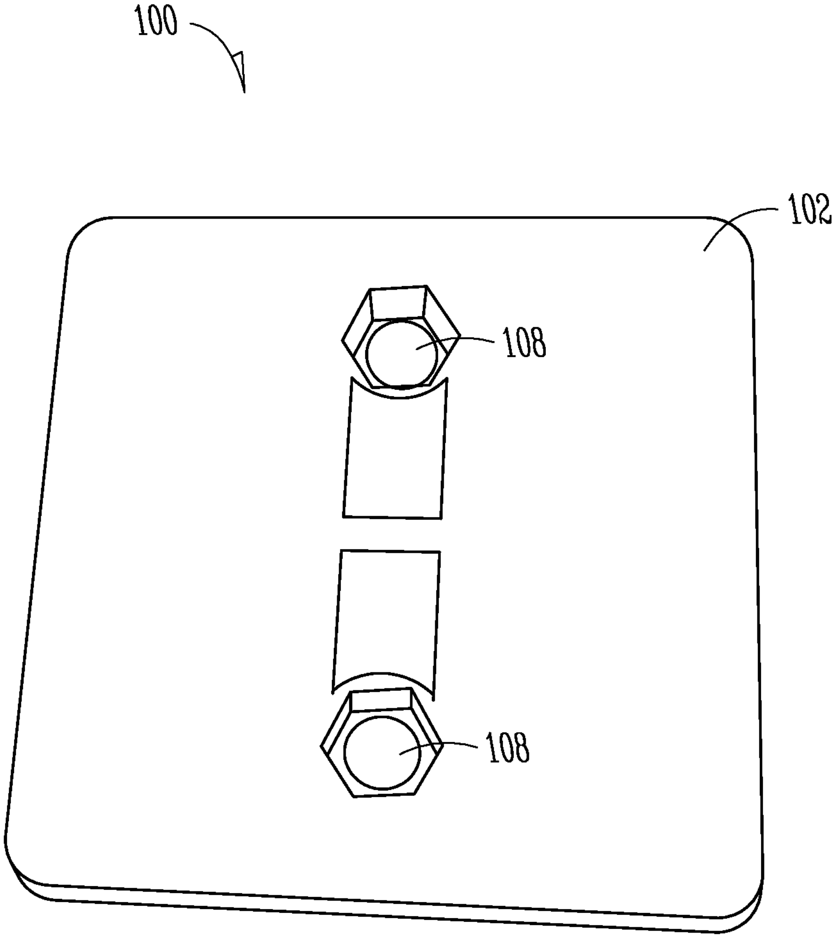
FIG. 8 illustrates a top view of an example embodiment of a door latch block assembly.
Figure 9:
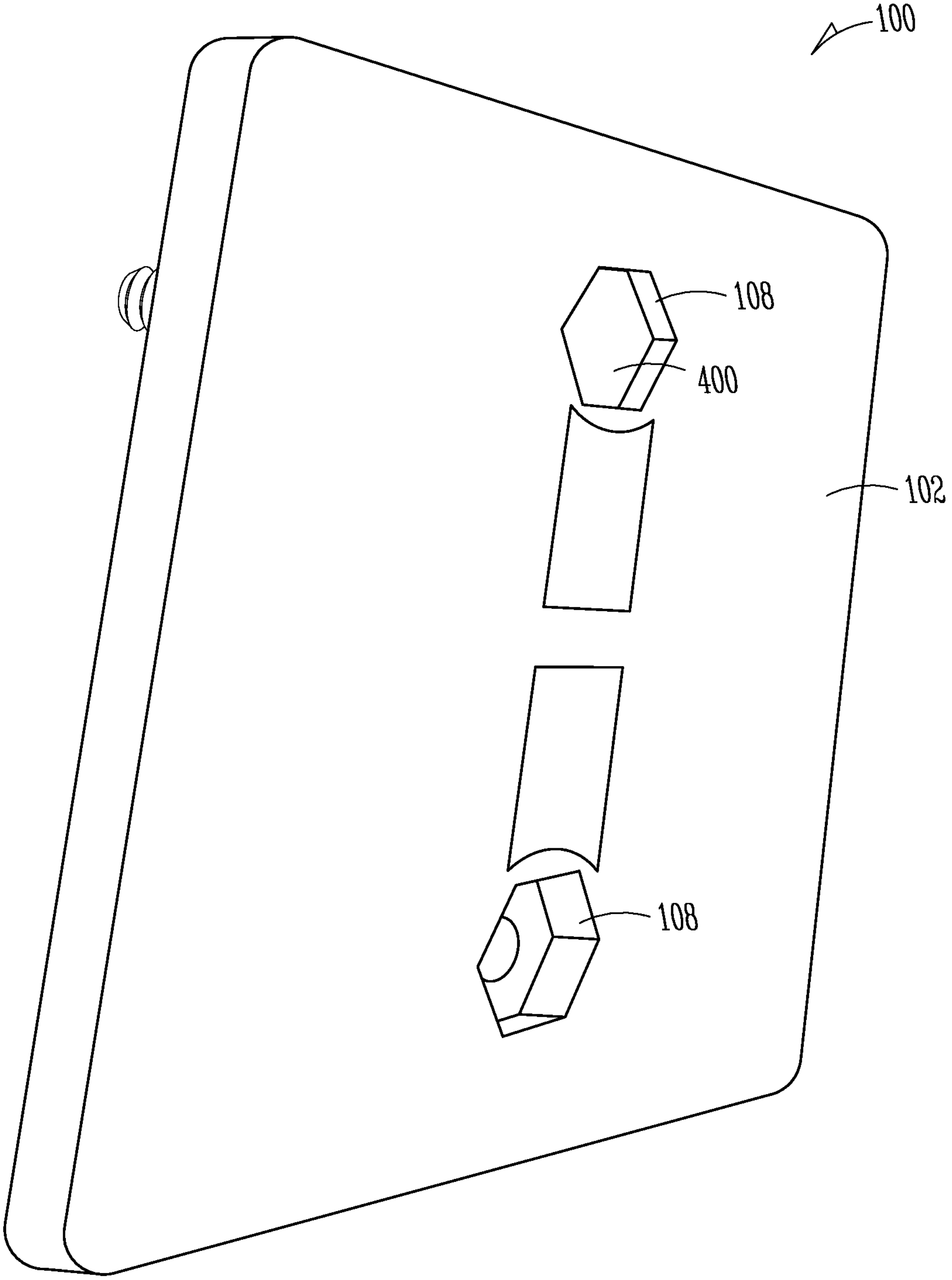
FIG. 9 illustrates a top view of an example embodiment of a door latch block assembly.
Figure 10:
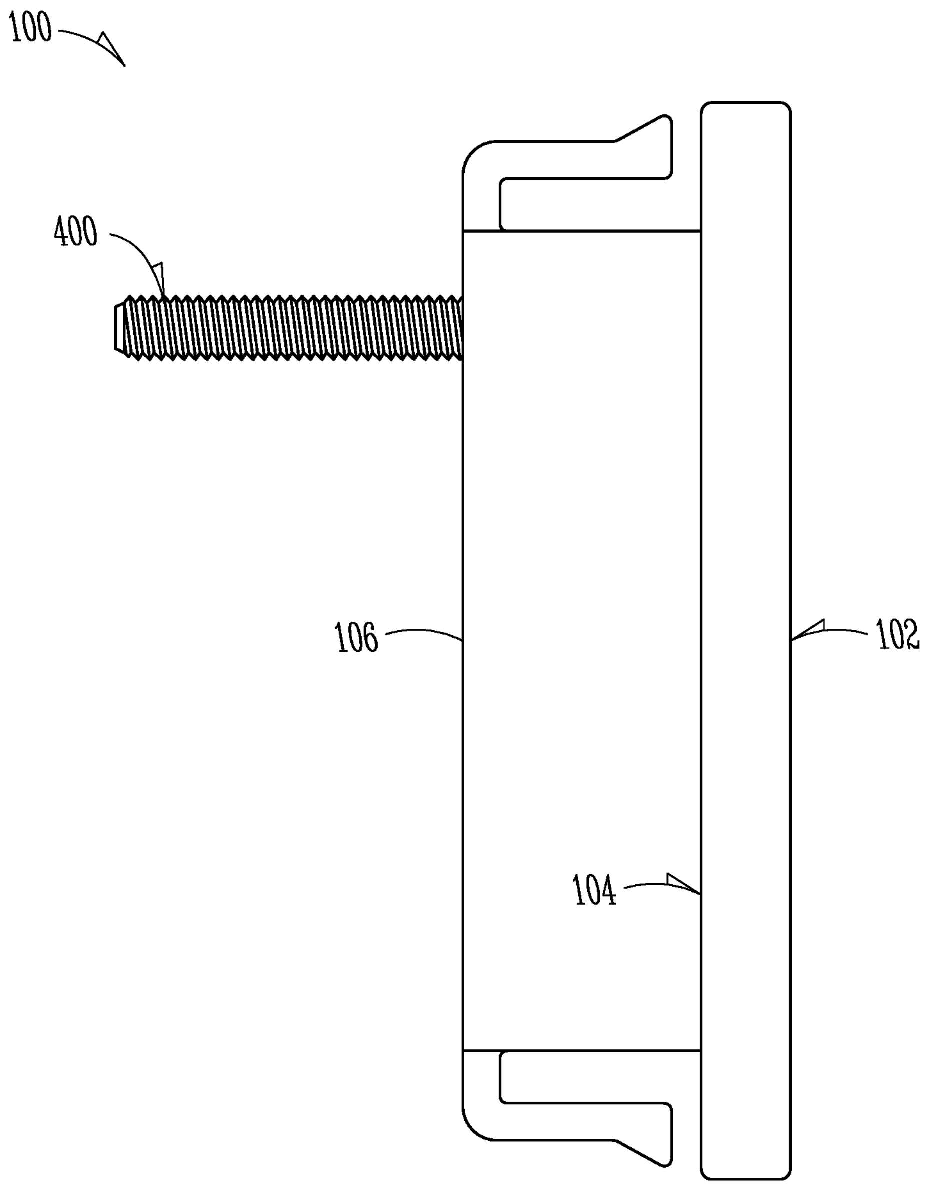
FIG. 10 illustrates a lateral view of an example embodiment of a door latch block assembly.
Figure 11:
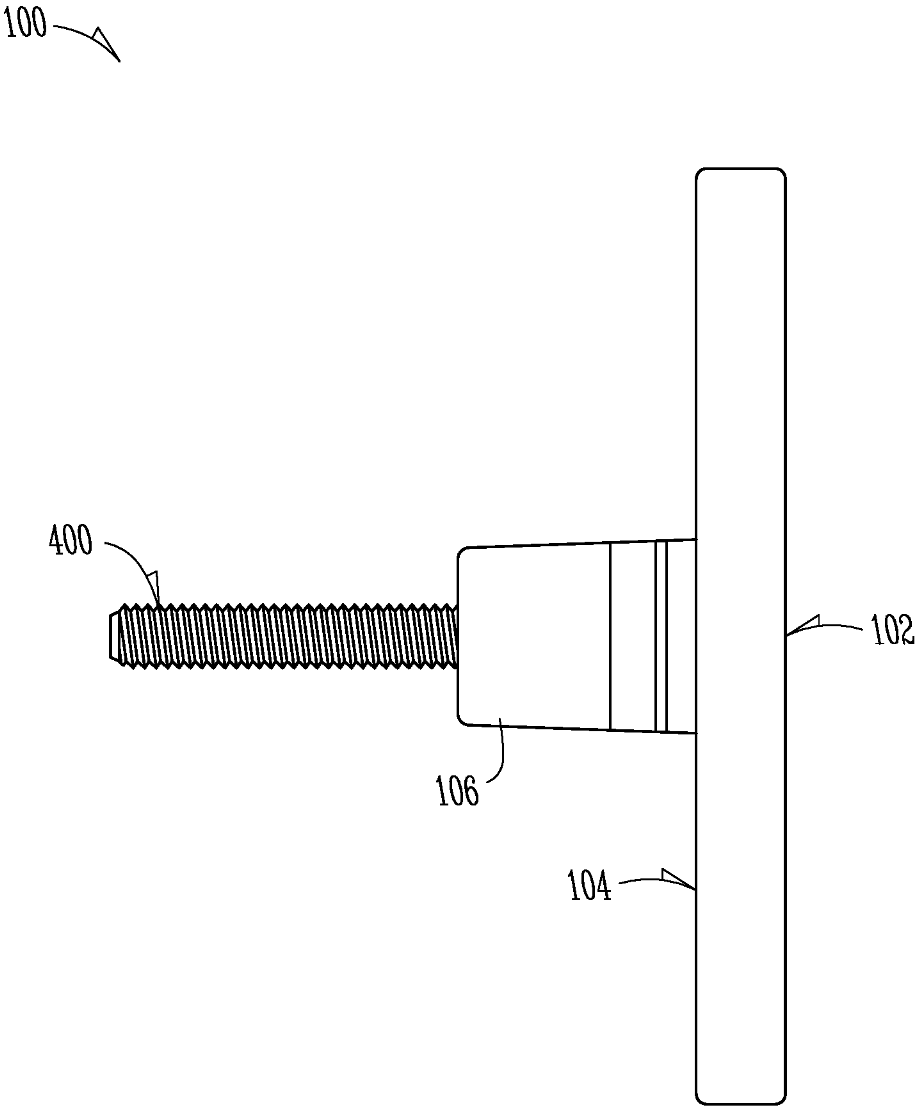
FIG. 11 illustrates a side view of an example embodiment of a door latch block assembly.
Figure 12A:
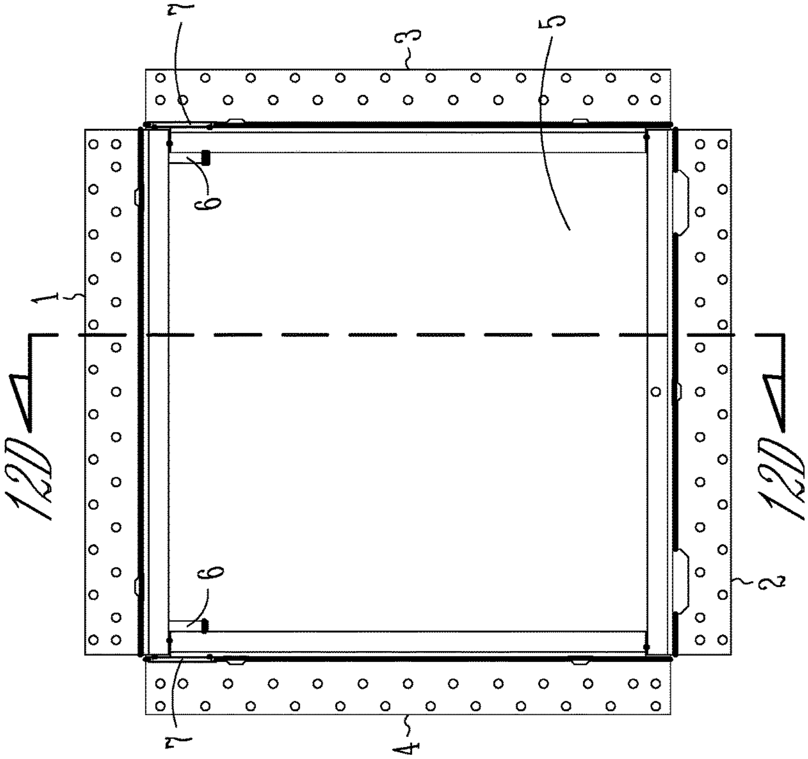
FIGS. 12A-12D illustrate schematic diagrams of an example embodiment of a door latch block assembly, latch, door frame, and door.
Figure 12B:
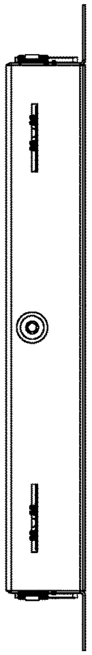
Figure 12C:
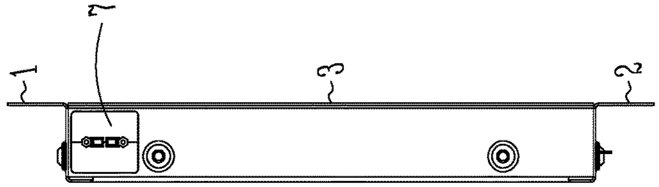
Figure 12D:
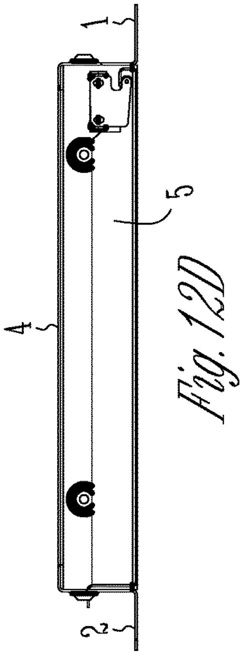

FIG. 8 illustrates a top view of an example embodiment of a door latch block assembly or apparatus 100. The door latch block apparatus 100 includes a first planar surface 102 configured to mount parallel to and facing away from a first side of a door frame for a construction surface. The apparatus 100 further provides two or more cylindrical openings 108 extending through the latch block apparatus 100, the two or more cylindrical openings 108 configured to receive hardware for affixing a latching mechanism. FIG. 9 illustrates a top view of an example embodiment of a door latch block assembly. FIG. 10 illustrates a lateral view of an example embodiment of a door latch block assembly. FIG. 11 illustrates a side view of an example embodiment of a door latch block assembly. In the depicted embodiments of FIGS. 9-11, hardware 400 is shown installed through one of the cylindrical openings 108.

In some embodiments, the door includes an access door in a commercial building. Other types of doors can be used without departing from the scope of the present subject matter. FIGS. 12A-12D illustrate schematic diagrams of an example embodiment of a door latch block assembly or apparatus 7, latch 6, access door frame 1, 2, 3, 4, and access door or door panel 5. The door latch block apparatus 7 extends through the access door frame 1, 2, 3, 4 and connects to the latch 6, in various embodiments. In various embodiments, the access door frame 1, 2, 3, 4 and the access door panel 5 are constructed of steel. In some embodiments, the access door frame 1, 2, 3, 4 is constructed of 18 gauge galvannealed satin coat steel. The access door panel 5 is constructed of 20 gauge galvannealed satin coat steel, in some embodiments.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A latch block apparatus comprising:

a first planar surface configured to mount parallel to and facing away from a first side of a door frame;

a second planar surface configured to mount flush with and facing toward the first side of the door frame;

a rectangular protrusion extending from the second planar surface, the rectangular protrusion configured to extend through an aperture in the door frame and protrude from a second side of the door frame when the latch block apparatus is mounted to the door frame; and two or more cylindrical openings extending through the latch block apparatus from the first planar surface through the second planar surface and the rectangular protrusion, the two or more cylindrical openings configured to receive hardware for affixing a latching mechanism to a distal end of the protrusion, wherein the latch block apparatus is configured to provide precise alignment of the latching mechanism for securing the door frame to a door in a closed position.

2. The apparatus of claim 1, wherein the rectangular protrusion includes engagement teeth on opposite ends of the rectangular protrusion to engage the latch block apparatus to the door frame.

3. The apparatus of claim 1, wherein the first planar surface includes recessed portions of the two or more cylindrical openings having a hexagonal shape and configured to secure a head portion of the hardware.

4. The apparatus of claim 1, wherein the latch block apparatus is constructed from plastic.

5. The apparatus of claim 1, wherein the latch block apparatus is constructed from a cast nylon material.

6. The apparatus of claim 5, wherein the latch block apparatus is constructed from a glass-filled cast nylon material.

7. The apparatus of claim 6, wherein the latch block apparatus is constructed from 30% glass-filled nylon 6.

8. A latch block apparatus comprising:

a planar surface configured to mount flush with and facing toward a first side of a door frame;

a rectangular protrusion extending from the planar surface, the rectangular protrusion configured to extend through an aperture in the door frame and protrude from a second side of the door frame when the latch block apparatus is mounted to the door frame; and two or more cylindrical openings extending through the latch block apparatus through the planar surface and the rectangular protrusion, the two or more cylindrical openings configured to receive hardware for affixing a latching mechanism to a distal end of the protrusion, wherein the latch block apparatus is configured to provide precise alignment of the latching mechanism for securing the door frame to a door in a closed position.

9. The apparatus of claim 8, wherein the rectangular protrusion includes engagement teeth on opposite ends of the rectangular protrusion to engage the latch block apparatus to the door frame.

10. The apparatus of claim 8, wherein the two or more cylindrical openings include recessed portions having a hexagonal shape and configured to secure a head portion of the hardware.

11. The apparatus of claim 8, wherein the latch block apparatus is constructed from plastic.

12. The apparatus of claim 8, wherein the latch block apparatus is constructed from a cast nylon material.

13. The apparatus of claim 12, wherein the latch block apparatus is constructed from a glass-filled cast nylon material.

14. The apparatus of claim 13, wherein the latch block apparatus is constructed from 30% glass-filled nylon 6.

15. A method of making a latch block apparatus, the method comprising:

providing a first planar surface configured to mount parallel to and facing away from a first side of a door frame;

providing a second planar surface configured to mount flush with and facing toward the first side of the door frame;

providing a rectangular protrusion extending from the second planar surface, the rectangular protrusion configured to extend through an aperture in the door frame and protrude from a second side of the door frame when the latch block apparatus is mounted to the door frame; and providing two or more cylindrical openings extending through the latch block apparatus from the first planar surface through the second planar surface and the rectangular protrusion, the two or more cylindrical openings configured to receive hardware for affixing a latching mechanism to a distal end of the protrusion, wherein the latch block apparatus is configured to provide precise alignment of the latching mechanism for securing the door frame to a door in a closed position.

16. The method of claim 15, wherein providing the rectangular protrusion includes providing engagement teeth on opposite ends of the rectangular protrusion to engage the latch block apparatus to the door frame.

17. The method of claim 15, wherein providing the two or more cylindrical openings includes providing recessed portions of the two or more cylindrical openings having a hexagonal shape and configured to secure a head portion of the hardware.

18. The method of claim 15, wherein providing the first planar surface includes providing a plastic surface.

19. The method of claim 15, wherein providing the first planar surface includes providing a cast nylon surface.

20. The method of claim 19, wherein providing the first planar surface includes providing a glass-filled cast nylon surface.

* * * * *